3,466,272
PROCESS FOR THE PREPARATION OF POLYISO-
PRENE UTILIZING A TITANIUM TETRAHALIDE
AND THE REACTION PRODUCT OF AN ALUMI-
NUM ALKYL AND A CYANOGEN HALIDE
Kan Mori, Masato Kawakami, Yasumi Sugihara, Shoji Kimura, Tooru Shibata, and Akira Koguré, Yokkaichi-shi, Japan, assignors to Japan Synthetic Rubber Co., Ltd., Tokyo, Japan, a corporation of Japan
No Drawing. Filed Sept. 18, 1967, Ser. No. 668,676
Claims priority, application Japan, Sept. 26, 1966, 41/63,161
Int. Cl. C08d 1/14, 3/12
U.S. Cl. 260—94.3                3 Claims

ABSTRACT OF THE DISCLOSURE

Isoprene is polymerized with the aid of a catalyst prepared by a reaction of (A) a titanium tetrahalide with (B) a reaction product of a trialkyl aluminum with a cyanogen halide. 0.1 to 1 mol of the cyanogen halide is used per 1 mol the trialkyl aluminum. Handling of the catalyst and controlling of the polymerization using said catalyst are very easy. Products have high cis-1,4 content and physical properties closer to those of a natural rubber.

---

The present invention relates to the preparation of polyisoprene, especially cis-1,4-polyisoprene having physical properties closer to those of a natural rubber.

That when isoprene is polymerized by using a typical Ziegler catalyst, for instance, combination of titanium tetrachloride with a trialkyl aluminium, cis-1,4-polyisoprene is obtained, has been already known. However, upon preparing cis-1,4-polyisoprene by use of the catalyst of this type, in order to obtain a product having a satisfactorily high molecular weight and a small content of a tight gel at a good yield, the molar ratio of Ti/Al in the catalyst system has to be controlled in a very narrow range of 1/0.8–1/1.3. Further, yield and molecular weight of the product are greatly affected by a temperature at which the catalyst is prepared and the polymerization is conducted. Therefor, in a large scale continuous production of cis-1,4-polyisoprene using the catalyst of this type, a consistent quality control of the product has not been easy. Further, the catalyst exists in the polymerization system as a phase heterogeneous to the polymerization medium, which has been often inconvenient. Further, there has been a shortcoming that a vulcanizate of the product lays behind, in respect of certain physical properties, a vulcanized natural rubber.

It has now been found, however, that a novel catalyst prepared by a reaction of (A) a titanium tetrahalide with
(B) a reaction product of a trialkyl aluminium with a cyanogen halide in an amount of 0.1–1.0 mol based on 1 mol of said trialkyl aluminium polymerizes isoprene readily to a polymer having high cis-1,4 configuration and physical properties closer to those of a natural rubber; that said novel catalyst is much easier in handling than the known catalyst prepared by a reaction of a titanium tetrahalide with a trialkyl aluminium in a large scale operation; and that a polymerization reaction of isoprene using said novel catalyst is easier to control.

These discoveries have been truly surprising and unexpectable, because it has been found that a combination of a titanium tetrahalide with a dialkyl aluminium cyanide or halide has entirely poor catalytic activity to a polymerization of isoprene.

The present invention provides a process for the preparation of polyisoprene which comprises contacting, with a catalyst prepared by a reaction of a titanium tetrahalide with an organoaluminium compound, isoprene in a hydrocarbon solvent under an atmosphere of an inert gas, characterized by using as said organoaluminium compound a reaction product of a trialkyl aluminium with a cyanogen halide in an amount of 0.1–1.0 mol based on 1 mol of said trialkyl aluminium.

As a titanium tetrahalide which is one component of the catalyst of the present invention, titanium tetrachloride is preferable. However, other titanium tetrahalides, for instance, titanium tetrabromide and titanium tetraiodide are also usable.

The other component of the catalyst of the present invention is a reaction product of a trialkyl aluminium with a cyanogen halide in an amount of 0.1–1.0 mol based on 1 mol of said trialkyl aluminium. Three alkyl groups in a trialkyl aluminium may be the same or different, straight-chain or branched alkyl groups having 1–20 preferably 1–8 carbon atoms. As examples of a preferable trialkyl aluminium, trimethyl-, triethyl-, tripropyl-, tri-n-butyl-, tri-tert.-butyl-, tri-hexyl- and trioctyl-aluminium may be cited. As a cyanogen halide, cyanogen bromide is especially preferable. However, cyanogen chloride and cyanogen iodide are usable too.

It is preferable to carry out the reaction of a trialkyl aluminium with a cyanogen halide in a hydrocarbon solvent under an atmosphere of an inert gas by mixing these reaction components. When mixed, the two components violently react generating heat. The molar ratio of a trialkyl aluminium to a cyanogen halide is within the range of 1:0.1 to 1:1.0, preferably 1:0.4 to 1:0.8. When the amount of a cyanogen halide used is less than 0.1 mol based on 1 mol of said trialkyl aluminium, the benefit due to the present invention cannot be enjoyed. On the other hand, when the amount of a cyanogen halide used exceeds 1.0 mol based on 1 mol of said trialkyl aluminium, even if the obtained reaction product is combined with a titanium tetrahalide, only a very poor catalytic activity is achieved.

The catalyst of the present invention is prepared by a reaction of said component (A), namely, a titanium tetrahalide with said component (B), namely, a reaction product of a trialkyl aluminium with a cyanogen halide in an amount of 0.1–1.0 mol based on 1 mol of said trialkyl aluminium. The ratio of the used component (A) and component (B) depends upon a molar ratio of a trialkyl aluminium to a cyanogen halide, but it is preferable to so select the ratio that it gives a molar ratio of titanium to aluminium of 1:1 to 1:10. In most cases, a molar ratio of titanium to aluminium of 1:1.5 to 1:5 gives the best results. In the process of the present invention, it has been found that even when the molar ratio of titanium to aluminium varies within said range, the catalytic activity and molecular weight of the product hardly change, which is contrastive to the conventional technology wherein combination of a titanium tetrahalide with a trialkyl aluminium is used, and the molar ratio of titanium to aluminium must be controlled within a very narrow range of 1:0.8 to 1:1.3.

A preferable process for preparing the catalyst of the present invention comprises mixing said component (A) with said component (B) in a hydrocarbon solvent under an atmosphere of an inert gas at a temperature within the range of −80° C. to 100° C. Mixing of the two components may be carried out in the presence of a part or whole of isoprene to be polymerized. When mixing of the two components is carried out at a temperature lower than about −30° C., the produced catalyst system is completely soluble in a hydrocarbon solvent, for instance, toluene. When mixing of the two components is carried out at a higher temperature, for instance, a temperature above 20° C., the produced catalyst system is heterogeneous. However, size of particles of the catalyst formed is very fine and almost colloidal, which is contrastive to the hitherto known titanium tetrahalide-trialkyl aluminium catalyst system which is substantially heterogeneous. Because the catalyst of the present invention is excellent in solubility or dispersibility in the polymerization medium, handling thereof at the time of preparing the catalyst is easier, stirring of the polymerization system at the time of polymerization can be carried out under milder conditions and the catalytic activity is larger. Again in the known titanium tetrahalide-trialkyl aluminium catalyst, change of a temperature at which it is prepared greatly affects yield of the produced polymer, in contrast thereto, it has been found that in the catalyst of the present invention, the influence is very little.

As a process for preparing the catalyst in the present invention, as mentioned above, mixing of a reaction product of a trialkyl aluminium with a cyanogen halide, with a titanium tetrahalide is most preferable. The catalyst of the present invention may also be prepared by mixing a trialkyl aluminium with a mixture of a titanium tetrahalide with a cyanogen halide. In this case, when a trialkyl aluminium is mixed with a mixture of a titanium tetrahalide with a cyanogen halide, it seems that at first a trialkyl aluminium mainly reacts with a cyanogen halide, followed by a reaction of the reaction product with a titanium tetrahalide. Accordingly, preparation of the catalyst in the present invention comprises first mixing a titanium tetrahalide with a cyanogen halide, followed by mixing the mixture with a trialkyl aluminium. In this case it is preferable to properly control the temperature so that it may not become too high. However, in the case that a titanium tetrahalide is mixed at first with a trialkyl aluminium, and then a cyanogen halide is added thereto, a reaction product of a titanium tetrahalide with a trialkyl aluminium separates as precipitate and even if said precipitate is contacted with a cyanogen halide, a catalyst capable of enjoying the benefit due to the present invention is not obtained.

The polymerization reaction in accordance with the present invention may be carried out by a process known per se except using said catalyst. Namely, it may be carried out by contacting isoprene with said catalyst in a hydrocarbon solvent under an atmosphere of an inert gas.

As a hydrocarbon solvent, an aliphatic hydrocarbon such as pentane, hexane and heptane, an alicyclic hydrocarbon such as cyclopentane and cyclohexane, and an aromatic hydrocarbon such as benzene, toluene, xylene and ethyl benzene may be used.

As an inert gas, nitrogen and argon are usable. However, from economical reason nitrogen is especially preferable.

The polymerization temperature may vary within the relatively broad range, for instance, from −20° C. to 100° C. However, a range of about 0° C. to 60° C. is preferable. In the hitherto known process of using a titanium tetrahalide—a trialkyl aluminium catalyst, as is well known, influence exerted on molecular weight of the produced polymer by change of the polymerization temperature is relatively large. However, it has been found that in the process of the present invention said influence is relatively small. Accordingly, in this respect also control of the polymerization reaction is easy in accordance with the present invention.

As to pressure of the polymerization reaction, there is no particular limitation and any pressure will do insofar as it is sufficient to keep the reaction mixture in a liquid phase.

Amount of the catalyst is ordinarily about 0.001–0.05 mol, preferably about 0.002–0.01 mol based on titanium per 1 mol of isoprene.

When the polymerization reaction proceeds to a predetermined stage, the reaction is stopped by a normal process and the objective polyisoprene can be obtained by separating, washing and drying the produced polymer.

Polyisoprene obtained in accordance with the process of the present invention has generally a high percentage of cis-1,4 configuration, which is normally above about 95%, and under especially preferable conditions it has above about 98% of cis-1,4 configuration. It has been found out that polyisoprene obtained in accordance with the present invention is closer to a natural rubber. Accordingly, polyisoprene obtained in accordance with the present invention is usable for various purposes for which a natural rubber is used. It is well known in rubber industry circles that throughout a natural rubber and synthetic rubbers what can be used alone without inconvenience as a rubber for heavy duty tires is only a natural rubber. However, it has been found out that polyisoprene obtained in accordance with the process of the present invention is advantageous as heavy duty tires as compared with the conventional polyisoprene, because in relation of elongation at break with temperature, a temperature at which lowering of elongation starts is, in the case of polyisoprene obtained in accordance with the process of the present invention, about 115° C. which is about same as that of a natural rubber, whereas the same temperature in the case of polyisoprene obtained by using the conventional titanium tetrahalide-trialkyl aluminium catalyst is about 40–60° C. and that of polyisoprene obtained by using an alkyl lithium catalyst is about −20° C. to 30° C.

The following examples are given to illustrate the present invention but it shall be understood that the examples are merely illustrative and not intended to limit the scope of the invention.

In examples, intrinsic viscosity [$\eta$] of the polymer was measured in toluene at 30° C. Cis-1,4 configuration content of the polymer was calculated according to Richardson method [J. Polymer Sci., 10, 853 (1953)] after measuring infrared absorption spectrum of a carbon disulfide solution of the polymer.

Example 1

(a) Triethyl aluminium and cyanogen bromide in a molar ratio of 2:1 were reacted in toluene while being cooled with ice. Concentration of aluminium in a toluene solution of the reaction product was 2 g. atom/l.

Into a 3-liter reactor whose inside atmosphere had been replaced by nitrogen 1,650 ml. of toluene, 286 g. of isoprene and 17.5 ml. of said toluene solution of the reaction product were sequentially introduced at a room temperature. Then, while cooling the contents to 20° C., 8.75 ml. of a toluene solution of titanium tetrahalide (titanium concentration:2 mols/l.) was added thereto with stirring.

Immediately after addition of titanium tetrachloride, a polymerization reaction began and was carried out at 20° C. under atmospheric pressure for 5 hours. Toluene used in this example contained 13 p.p.m. of water.

Then, to the reaction mixture, 50 ml. of a toluene-methanol mixed solution (volume ratio 4:1) containing 2% of 2,6-di-tert.-butylphenol (antioxidant) was added to stop the reaction, and the reaction mixture was poured into large amount of methanol containing 2% of the same antioxidant to coagulate the produced polymer. The produced polymer was separated, put inside a mixer wherein it was stirred and washed for several times with methanol, followed by drying under a reduced pressure at a room temperature, and thereby 110 g. of polyisoprene was obtained. The obtained polyisoprene had an intrinsic viscosity of 3.76, a gel content of 0.5% and cis-1,4, configuration content of 98%.

(b) The aforesaid operations of (a) were repeated except using a titanium tetrachloride-triethyl aluminium catalyst and except that the polymerization was carried out under the following recipe and conditions.

Polymerization recipe:
```
    Toluene _____ml__  1700
    Isoprene _____g__   240
    Titanium tetrachloride _____millimol__    25
    Triethyl aluminium _____do____        25
    Polymerization period _____hours__       6
    Polymerization temperature _____° C__     0
```

Yield, intrinsic viscosity and gel content of the obtained polyisoprene was 52%, 3.12 and 2.5%, respectively.

(c) Each of polyisoprenes obtained in (a) and (b) was compounded by the following compounding recipe and vulcanized at 145° C. for 50 minutes.

Compounding recipe:                    Parts by weight
```
    Polyisoprene _____ 100
    Zinc oxide _____   5
    Sulfur _____   2
    2246[1] _____   1
    DPG[2] _____   2
    Stearic acid _____   2
```

[1] 2,2'-methylenebis(4-methyl-6-tert.-butylphenol).
[2] Diphenyl guadidine.

Results of physical test of the vulcanizates are shown in Table 1. The test method was in accordance with JIS K 6301. A dumb-bell shape was type No. 3.

TABLE 1

| Tested item | Polyisoprene | |
| --- | --- | --- |
|  | Sample of (a) | Sample of (b) |
| Elongation (percent) | 866 | 821 |
| Tensile strength (kg./cm.$^2$) | 209 | 141 |
| 100% Modulus (kg./cm.$^2$) | 5.9 | 5.8 |

Example 2

The operations of Example 1(a) were repeated except water content of toluene used was 30 p.p.m., a catalyst was prepared by introducing into the reactor a toluene solution of a reaction product of triethyl aluminum with cyanogen bromide and a toluene solution of titanium tetrachloride in this order and by aging the mixture with stirring at 20° C. for 30 minutes, and to this system isoprene was added and a polymerization reaction was carried out at 30° C. for 4 hours.

Yield, intrinsic viscosity, gel content and cis-1,4 configuration content of the obtained polyisoprene was 63%, 3.28, 0.5% and 98%, respectively.

Example 3

Isoprene was polymerized as in Epample 1(a), except the amount of isoprene was made 238 g., 8.5 ml. of a toluene solution of titanium tetrachloride was used, the polymerization temperature was changed to 30° C. and toluene used had water content of 30 p.p.m.

Yield of the produced polyisoprene was 70%, intrinsic viscosity thereof was 2.45 and a gel content thereof was 1.0%.

Examples 4–16

In these examples, examples of varying ratio of composition of catalyst are shown.

Into a 100 ml. Schlenk-type ampoule, 50 ml. of a toluene solution containing 6.8 g. of isoprene and predetermined amounts of a toluene solution of a reaction product obtained by reacting triethyl aluminium with cyanogen bromide at predetermined ratios were introduced at a room temperature. Then, said contents were cooled to −78° C. to which with well stirring 1 ml. of a toluene solution of titanium tetrachloride (concentration:0.5 mol/l.) was added, and toluene was further added to make the whole volume 60 ml. The foregoing operations were all carried out under an atmosphere of nitrogen. Water content of toluene used was 25 p.p.m. The ampoule was immediately sealed and a polymerization reaction was carried out at 30° C. for 5 hours. The results are shown in Table II.

TABLE II

| Example No. | Al(C$_2$H$_5$)$_3$/BrCN (molar ratio) | Ti/Al (molar ratio) | Yield of a polymer (percent) | ($\eta$) | Gel content (percent) |
| --- | --- | --- | --- | --- | --- |
| 4 | 2.0/1.0 | 1/1.8 | 75.9 | 1.89 | 1.0 |
| 5 | 2.0/1.0 | 1/2.0 | 78.1 | 1.71 | 1.0 |
| 6 | 2.0/1.0 | 1/2.2 | 80.9 | 1.81 | 1.3 |
| 7 | 2.0/1.0 | 1/2.4 | 77.5 | 1.89 | 1.0 |
| 8 | 2.0/1.0 | 1/2.6 | 81.7 | 1.72 | 0.9 |
| 9 | 2.0/1.0 | 1/2.8 | 76.8 | 1.71 | 1.5 |
| 10 | 2.0/1.2 | 1/2.5 | 69.2 | 2.45 | 0.0 |
| 11 | 2.0/1.2 | 1/2.8 | 69.2 | 2.48 | 0.0 |
| 12 | 2.0/1.2 | 1/3.1 | 69.3 | 2.25 | 0.0 |
| 13 | 2.0/1.2 | 1/3.4 | 69.6 | 2.43 | 0.8 |
| 14 | 2.0/1.2 | 1/3.7 | 67.5 | 2.78 | 1.2 |
| 15 | 2.0/1.2 | 1/4.0 | 62.5 | 2.27 | 2.7 |
| 16 | 2.0/1.2 | 1/4.8 | 63.2 | 2.16 | 2.0 |

Referential Examples 1–4

Example 4 was repeated by using predetermined amounts of triethyl aluminium instead of a reaction product of triethyl aluminium with cyanogen bromide. The results are shown in Table III.

TABLE III

| Referential Example | Ti/Al (molar ratio) | Yield of a polymer (percent) | ($\eta$) | Gel content (percent) |
| --- | --- | --- | --- | --- |
| 1 | 1/1.0 | 51.2 | 2.18 | 21.5 |
| 2 | 1/1.1 | 40.8 | 2.39 | 10.3 |
| 3 | 1/1.2 | 47.1 | 1.66 | 2.7 |
| 4 | 1/1.3 | 24.6 | 1.73 | 9.6 |

Examples 17–27

In these examples, examples of varying catalyst preparing conditions are shown.

The polymerization recipe, polymerization temperature and polymerization period of time were exactly the same as those of Example 4, except water content of toluene, which was controlled to 10 p.p.m. The results are shown in Table IV.

In Table IV, IP stands for isoprene, component (A) for titanium tetrachloride and component (B) for a reaction product of triethyl aluminium with cyanogen bromide, and "Catalyst preparing temperature" means a contact temperature of component (A) with component (B). In the column of "Adding order of isoprene and catalyst components," in Examples 17–21, 22 and 24 at predetermined catalyst preparing temperatures IP, component (A) and component (B) are introduced in this order into the ampoule, in Examples 23 and 25 at predetermined catalyst preparing temperatures components (B) and (A) are introduced, the mixture is aged at the temperatures and for the periods described therein, finally at the temperatures IP is introduced, and in Examples 26 and 27, at predetermined catalyst preparing temperatures, of IP to be polymerized 5 millimols is at first introduced, followed by components (B) and (C), the mixture is aged at the temperatures for the periods described therein, and finally at the temperatures the remaining IP is introduced. Throughout Examples 17–27, into an ampoule toluene was introduced at first, followed by components (A) and (B) and IP in the order described, the contents were cooled to −78° C., the ampoule was sealed, and a polymerization reaction was carried out.

TABLE IV

| Example | Catalyst preparing temperature (° C.) | Adding order of isoprene and catalyst components | Yield (percent) | ($\eta$) | Gel content (percent) |
|---|---|---|---|---|---|
| 17 | −78 | IP-comp. (B)-comp. (A) | 54.0 | 3.38 | 0.7 |
| 18 | −30 | IP-comp. (B)-comp. (A) | 49.8 | 3.28 | 1.8 |
| 19 | 0 | IP-comp. (B)-comp. (A) | 49.8 | 3.53 | 1.5 |
| 20 | 20 | IP-comp. (B)-comp. (A) | 50.9 | 3.37 | 1.7 |
| 21 | 40 | IP-comp. (B)-comp. (A) | 50.0 | 3.52 | 1.4 |
| 22 | 20 | Comp. (B)-comp. (A)-IP | 48.5 | 2.96 | 8.8 |
| 23 | 20 | Comp. (B)-comp. (A) 20 min./20° C. IP | 42.6 | 3.24 | 3.7 |
| 24 | −30 | Comp. (B)-comp. (B)-IP | 51.2 | 3.05 | 0.3 |
| 25 | −30 | Comp. (B)-comp. (A) 30 min./20° C. IP | 58.6 | 2.89 | 0.5 |
| 26 | 20 | IP-comp. (B)-comp. (A) 30 min./20° C. IP | 47.7 | 2.97 | 5.4 |
| 27 | −30 | IP-comp. (B)-comp. (A) 30 min./20° C. IP | 55.6 | 2.63 | 5.4 |

Examples 28–30

In these examples, influence of the polymerization temperature over yield, molecular weight and gel content of the polymer is observed.

The polymerization process was exactly the same as that of Example 5 except the polymerization temperature was varied and the catalyst was prepared at 20° C. The results are shown in Table V.

TABLE V

| Example | Polymerization temperature (° C.) | Yield (percent) | ($\eta$) | Gel content (percent) |
|---|---|---|---|---|
| 28 | 20 | 73.6 | 2.25 | 0.8 |
| 29 | 30 | 79.2 | 2.13 | 0.4 |
| 30 | 40 | 79.3 | 1.93 | 0.5 |

Examples 31–33

In these examples, examples of changing the kinds of a titanium tetrahalide and a cyanogen halide are shown.

The polymerization recipe, conditions and operating process were same as those of Example 4 except changing molar ratio of triethyl aluminium to a cyanogen halide and molar ratio of titanium to aluminium together with kinds of a titanium tetrahalide and a cyanogen halide, and except that the catalyst was prepared at 20° C. The results are shown in Table VI.

TABLE VI

| Example | $TiX_4$ | XCN | $Al(C_2H_5)_3$/XCN (molar ratio) | Ti/Al (molar) | Yield (percent) | ($\eta$) | Gel content (percent) |
|---|---|---|---|---|---|---|---|
| 31 | $TiBr_4$ | BrCN | 1/0.6 | 1/3 | 68.4 | 2.60 | 0.0 |
| 32 | $TiCl_4$ | ClCN | 2/1 | 1/1.2 | 26.2 | 2.18 | 2.5 |
| 33 | $TiBr_4$ | ClCN | 2/1 | 1/2 | 38.5 | 2.43 | 1.3 |

Examples 34–38

In these examples, examples of cases wherein the two catalyst components are mixed and aged in the absence of isoprene are shown.

Into a 100 ml. ampoule, 48 ml. of toluene, predetermined amounts of a toluene solution of a reaction product of triethyl aluminium with cyanogen bromide

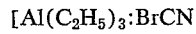

molar ratio=2:1, concentration of aluminium:1 g. atom/l.] and 1 ml. of a toluene solution of titanium tetrachloride (concentration:0.5 mol/l.) were added in this order. The ampoule was placed in a reaction bath whose temperature was controlled to 30° C., and the contents were stirred by a magnetic stirrer for 30 minutes.

Then, the ampoule was cooled to −78° C., 6.8 g. (0.1 mol) of isoprene was added to the contents, the ampoule was sealed, and thereafter the resultant contents were polymerized at 30° C. for 5 hours. The results are shown in Table VII.

TABLE VII

| Example | Amt. of Al (mg. atom) | Ti/Al (molar ratio) | Yield of a polymer (percent) | ($\eta$) | Gel content (percent) |
|---|---|---|---|---|---|
| 34 | 1.00 | 1/2.0 | 92.0 | 2.63 | 0.1 |
| 35 | 1.25 | 1/2.5 | 92.8 | 2.63 | 0.0 |
| 36 | 1.50 | 1/3.0 | 96.3 | 2.49 | 0.0 |
| 37 | 1.75 | 1/3.5 | 84.4 | 2.64 | 0.0 |
| 38 | 2.00 | 1/4.0 | 71.4 | 2.47 | 0.0 |

Example 39

Example 34 was repeated except 1 ml. of said toluene solution of a reaction product of triethyl aluminium with cyanogen bromide was used, the catalyst was prepared at 50° C., aging was carried out at said temperature for 1 hour and the polymerization reaction was carried out at 20° C. for 5 hours.

Yield of polyisoprene was 50%, intrinsic viscosity thereof was 4.0 and gel content thereof was 0.3%.

Examples 40–45

In these examples, as well as in Examples 26 and 27, examples of a case wherein the catalyst was prepared and aged in the presence of a very small amount of isoprene are shown.

Into a 100 ml. ampoule, 40 ml. of toluene, predetermined amounts of a toluene solution of isoprene (concentration:0.5 mol/l.), 1 ml. of a toluene solution of a reaction product of triethyl aluminium with cyanogen bromide [$Al(C_2H_5)_3$:BrCN molar ratio=2:1, concentration of aluminum:1 g. atom/l.] and 1 ml. of a toluene solution of titanium tetrachloride (concentration:0.5 mol/l.) were added, and toluene was further added thereto to control the entire volume to 50 ml. The foregoing operations were all carried out while the ampoule was shaken in a reaction bath kept at 30° C. After aging at 30° C. for 30 minutes, the contents were cooled to −78° C., 6.8 g. (0.1 mol) of isoprene was added thereto, the ampoule was sealed, and thereafter the resultant contents were polymerized at 30° C. for 5 hours. The results are shown in Table VIII.

TABLE VIII

| Example | Amt. of isoprene used for preparing a catalyst (mmol) | Isoprene/Ti molar ratio | Yield of a polymer (percent) | ($\eta$) | Gel content (percent) |
|---|---|---|---|---|---|
| 40 | 0 | 0/1 | 85.0 | 2.13 | 0.0 |
| 41 | 0.5 | 1/1 | 89.8 | 2.33 | 0.0 |
| 42 | 1.0 | 2/1 | 89.7 | 2.28 | 0.0 |
| 43 | 1.5 | 3/1 | 89.8 | 2.59 | 0.4 |
| 44 | 2.0 | 4/1 | 93.0 | 2.22 | 2.9 |
| 45 | 2.5 | 5/1 | 94.2 | 2.25 | 0.5 |

What is claimed is:

1. A process for the preparation of polyisoprene which comprises contacting, with a catalyst prepared by a reaction of a titanium tetrahalide with an organoaluminium compound, isoprene in a hydrocarbon solvent under an atmosphere of an inert gas, characterized by using as said organoaluminium compound a reaction product of a trialkyl aluminium with a cyanogen halide in a amount of 0.1–1.0 mol based on 1 mol of said trialkyl aluminium.

2. A process according to claim 1 wherein molar ratio of titanium to aluminium is within the range of 1:1 to 1:10.

3. A process for the preparation of polyisoprene which comprises contacting isoprene with a catalyst prepared by mixing (A) titanium tetrachloride with (B) a reaction product of a trialkyl aluminium each of whose alkyl groups has 1–8 carbon atoms with cyanogen bromide in an amount of 0.4–0.8 mol based on 1 mol of said trialkyl aluminium such that a molar ratio of titanium to aluminium may become 1:1.5 to 1:5 in a hydrocarbon solvent under an atmosphere of an inert gas.

References Cited

UNITED STATES PATENTS

| | | | |
|---|---|---|---|
| 3,078,263 | 2/1963 | Stearns | 260—94. |
| 3,045,001 | 7/1962 | Berger | 260—93. |

JOSEPH L. SCHOFER, Primary Examiner

R. A. GAITHER, Assistant Examiner